Patented Feb. 2, 1943

2,309,708

UNITED STATES PATENT OFFICE 2,309,708

MANUFACTURE OF ANTHRAQUINONE DERIVATIVES

Henry Charles Olpin, Christopher Stanley Argyle, and Frank Brown, Spondon, near Derby, England, assignors to Celanese Corporation of America, a corporation of Delaware No Drawing. Application July 9, 1940, Serial No. 344,606. In Great Britain August 21, 1939

7 Claims. (Cl. 260—369)

This invention relates to the purification of di-poly-nitro substituted anthraquinones and to the production therefrom of the corresponding amino-substituted anthraquinones.

In the nitration of anthraquinones and its derivatives containing at least two free $\alpha$-positions, to produce poly-$\alpha$-nitro-anthraquinones, that is to say, nitro-anthraquinones containing at least two nitro groups, it is usually found that the crude product is a mixture of isomers. Such mixtures contain, in addition to nitro compounds in which the nitro groups occupy exclusively $\alpha$-positions in the anthraquinone nucleus, undesired $\beta$-nitro-anthraquinones, i. e. compounds in which one or more $\beta$-nitro groups are present. The purification of the poly-$\alpha$-nitro-anthraquinones by the elimination therefrom of $\beta$-nitro-anthraquinones is a matter of some difficulty.

It has now been discovered that by treating the aforesaid crude mixed di- or poly-nitro-anthraquinones with a sulphite it is possible to bring about conversion of the nitro-anthraquinones containing one or more nitro groups in $\beta$-positions, into water-soluble products, probably sulphonic acids, which can readily be separated from the compounds containing only $\alpha$-nitro groups. After such separation there remains a poly-$\alpha$-nitro-anthraquinone which may consist of a mixture of isomers but which is substantially free from undesired $\beta$-nitro derivatives.

According to the present invention a crude poly-$\alpha$-nitro-anthraquinone contaminated with a $\beta$-nitro-anthraquinone is purified by subjecting it to the action of a sulphite until the $\beta$-nitro-anthraquinone has been converted into a water-soluble product and separating the latter from the poly-$\alpha$-nitro-anthraquinone.

Since poly-$\alpha$-nitro-anthraquinones can themselves be converted into sulphonic acids on treatment with a sulphite it will be understood that the conditions employed in carrying out the process of the invention must be so mild as not to lead to any serious loss of the desired poly-$\alpha$-nitro-anthraquinones by such conversion.

Compounds which can be purified according to the invention are anthraquinone derivatives which contain two or more nitro groups in $\alpha$-positions in the nucleus and may also contain other substituent groups which will not under the conditions employed themselves react or cause reaction with the sulphite to such an extent as to lead to serious loss of the desired nitro compounds. Examples of other groups which may be present in the anthraquinone nucleus are alkyl, aryl, cyclo-alkyl, aralkyl, hydroxy, amino and substituted amino groups. Sulphonic acid groups must of course be absent. The invention is, however, of especial value in connection with the purification of crude 1:5- and 1:8-dinitro-anthraquinones which are free from other substituent radicles or contain substituents, especially amino groups, only in the two remaining $\alpha$-positions of the anthraquinone nucleus.

A particularly convenient method of purifying the crude di-$\alpha$-nitro compound is to heat it for a few hours with a dilute aqueous solution of a soluble sulphite, especially ammonium sulphite or an alkali metal sulphite, for example sodium sulphite. After filtration and washing the product will be substantially free from undesired dinitro anthraquinones containing one or more nitro groups in $\beta$-positions. Preferably a solution of a normal sulphite is used.

The concentration of the sulphite solution and the amount of sulphite relative to the crude di-nitro-anthraquinone will depend to a certain extent on the particular di-nitro compounds being treated and the amount of undesired nitro derivatives present. Good results have been obtained with a 0.5–5%, preferably 1–2%, solution of sodium sulphite and 0.5–5 moles., preferably 1–2 moles., of the sulphite per mole. of the crude dinitro-anthraquinone. With the above proportions purification may generally be effected by boiling the crude dinitro-anthraquinone with the aqueous sulphite solution for from 1–5, preferably 2–4 hours.

The invention is of particular importance in connection with the purification of di-$\alpha$-nitro-anthraquinones which are designed for subsequent reduction to the corresponding amino anthraquinones. Thus, in the production of 1:4:5:8 - tetra - amino - anthraquinone from anthraquinone via 1:5- and 1:8-di-nitro-anthra-quinones and 1:5:4:8- and 1:8:4:5-dinitro-di-amino-anthraquinones, it is desirable that the intermediate dinitro- and dinitrodiamino-anthra-quinones should be freed from $\beta\beta$-and $\alpha\beta$-dini-trated derivatives as otherwise the resultant 1:4:5:8-tetra-amino-anthraquinone gives dyeings on cellulose acetate textiles which have an undesirable reddish tinge, due no doubt to the presence of impurities containing one or more $\beta$-amino groups. By applying the sulphite purification of the present invention to the intermediate dinitro- and dinitrodiamino-anthraquinones a much improved tetra-$\alpha$-amino-anthraquinone is produced. This invention, therefore, specifically includes the purification by means of sulphite of di-α-nitro-anthraquinones and di-α-nitrodi-α-amino anthraquinones and their subsequent conversion by reduction into di-α-amino-anthraquinones and tetra-α-amino-anthraquinones respectively.

The invention is illustrated by the following Examples.

*Example 1*

To a solution of 100 parts of anthraquinone in 1000 parts of sulphuric acid monohydrate are added slowly 230 parts of nitric acid (S. G. 1.5) in 230 parts of sulphuric acid monohydrate so that the temperature does not exceed 80° C., at which temperature the solution is maintained for five hours.

The crude product obtained by dilution and filtration of the above mixture is washed free from acid and boiled for 3 hours with 180 parts of sodium sulphite crystals in 6000 parts of water. After filtration and washing there is left a residue of 1:5- and 1:8-dinitro-anthraquinones substantially free from β-nitro derivatives.

*Example 2*

The product of Example 1 is reduced by stirring it with 2500 parts of water, 111 parts of caustic soda and 333 parts of glucose for 1 hour at 70° C. After filtration and washing the 1:5- and 1:8-diamino-anthraquinones are obtained as a red paste, which is dried.

*Example 3*

20 parts of the mixture of di-(acetylamino)-anthraquinones obtained by acetylation of the product of Example 2 are stirred with 200 parts of sulphuric acid monohydrate at 0° C. until solution is complete, whereupon 13.6 parts of nitric acid (S. G. 1.5) in 27 parts of sulphuric acid monohydrate are slowly added, the temperature being controlled during this addition and for 1 hour afterwards at 0–5° C. Without allowing the temperature to rise the nitration mixture is poured on to a large volume of chopped ice and water and the precipitated mixture of dinitro compounds filtered, washed acid-free and dried.

20 parts of the crude mixture of dinitro-1:5- and 1:8-diamino-anthraquinones obtained by hydrolysis of the above product are boiled for 3 hours with 26 parts of sodium sulphite crystals in 1000 parts of water. The product is filtered and washed and consists of a mixture of substantially pure 1:5-dinitro-4:8-diamino- and 1:8-dinitro-4:5-diaminoanthroquinones.

*Example 4*

10 parts of the mixed 1:5:4:8- and 1:8:4:5-dinitro-diamino-anthraquinones obtained as in Example 3 are heated at 70° C. for 2 hours with 300 parts of water, 10 parts of caustic soda and 30 parts of glucose (dissolved in 60 parts of water and added gradually at 70° C.). After allowing to cool, the product, 1:4:5:8-tetra-amino-anthraquinone, is filtered off and washed well with warm water.

Having described our invention, what we desire to secure by Letters Patent is:

1. Method of purifying a mixture selected from the group consisting of (a) a mixture of 1:5-dinitro-anthraquinone and 1:8-dinitro-anthraquinone contaminated with beta-nitro-compounds and resulting from the nitration of anthraquinone, and (b) a mixture of 1:5 dinitro-4:8-diamino-anthraquinone and 1:8-dinitro-4:5-diamino-anthraquinone contaminated with beta-nitro-compounds and resulting from the nitration and hydrolysis of a mixture of 1:5-di-(acetylamino)-4:8-dinitro-anthraquinone and 1:8-di-(acetylamino)-4:5-dinitro-anthraquinone, which comprises subjecting the mixture to the action of a water-soluble normal sulphite until the beta-nitro-compounds have been converted into water soluble products and separating the latter from the remaining mixture of 1:5- and 1:8-dinitro-compounds.

2. Method of purifying a mixture selected from the group consisting of (a) a mixture of 1:5-dinitro-anthraquinone and 1:8-dinitro-anthraquinone contaminated with beta-nitro-compounds and resulting from the nitration of anthraquinone, and (b) a mixture of 1:5 dinitro-4:8-diamino-anthraquinone and 1:8-dinitro-4:5-diamino-anthraquinone contaminated with beta-nitro-compounds and resulting from the nitration and hydrolysis of a mixture of 1:5-di-(acetylamino)-4:8-dinitro-anthraquinone and 1:8-di-(acetylamino)-4:5-dinitro-anthraquinone, which comprises subjecting the mixture to the action of a 0.5 to 5% aqueous solution of a water-soluble normal sulphite until the beta-nitro-compounds have been converted into water soluble products and separating the latter from the remaining mixture of 1:5- and 1:8-dinitro-compounds.

3. Method of purifying a mixture selected from the group consisting of (a) a mixture of 1:5-dinitro-anthraquinone and 1:8-dinitro-anthraquinone contaminated with beta-nitro-compounds and resulting from the nitration of anthraquinone, and (b) a mixture of 1:5 dinitro-4:8-diamino-anthraquinone and 1:8-dinitro-4:5-diamino-anthraquinone contaminated with beta-nitro-compounds and resulting from the nitration and hydrolysis of a mixture of 1:5-di-(acetylamino)-4:8-dinitro-anthraquinone and 1:8-di-(acetylamino)-4:5-dinitro-anthraquinone, which comprises subjecting the mixture to the action of a hot 0.5 to 5% aqueous solution of a normal alkali metal sulphite until the beta-nitro-compounds have been converted into water soluble products and separating the latter from the remaining mixture of 1.5-and 1:8-dinitro-compounds.

4. Method of purifying a mixture selected from the group consisting of (a) a mixture of 1:5-dinitro-anthraquinone and 1:8-dinitro-anthraquinone contaminated with beta-nitro-compounds and resulting from the nitration of anthraquinone, and (b) a mixture of 1:5 dinitro-4:8-diamino-anthraquinone and 1:8-dinitro-4:5-diamino-anthraquinone contaminated with beta-nitro-compounds and resulting from the nitration and hydrolysis of a mixture of 1:5-di-(acetylamino)-4:8-dinitro-anthraquinone and 1:8-di-(acetylamino)-4:5-dinitro-anthraquinone, which comprises subjecting the mixture to the action of a hot 0.5 to 5% solution of sodium sulphite until the beta-nitro-compounds have been converted into water soluble products and separating the latter from the remaining mixture of 1:5- and 1:8-dinitro-compounds.

5. Method of purifying a mixture selected from the group consisting of (a) a mixture of 1:5-dinitro-anthraquinone and 1:8-dinitro-anthraquinone contaminated with beta-nitro-compounds and resulting from the nitration of anthraquinone, and (b) a mixture of 1:5 dinitro-4:8-diamino-anthraquinone and 1:8-dinitro-4:5-diamino-anthraquinone contaminated with beta-nitro-compounds and resulting from the nitration and hydrolysis of a mixture of 1:5-di-(acetylamino)-4:8-dinitro-anthraquinone and 1:8-di-(acetylamino)-4:5-dinitro-anthraquinone, which comprises subjecting the mixture to the action of a hot 0.5 to 5% solution of ammonium sulphite until the beta-nitro-compounds have been converted into water soluble products and separating the latter from the remaining mixture of 1:5 and 1:8-dinitro-compounds.

6. Method of purifying a mixture of 1:5-dinitro-anthraquinone and 1:8-dinitro-anthraquinone contaminated with beta-nitro compounds and resulting from the nitration of anthraquinone, which comprises subjecting the mixture to the action of a hot 1–2% aqueous solution of normal sodium sulphite in an amount corresponding with 1–2 moles of normal sodium sulphite per mole of the crude mixture of dinitro-anthraquinones, until the beta-nitro-compounds have been converted into water-soluble products and separating the latter from the remaining mixture of 1:5-dinitro-anthraquinone and 1:8-dinitro-anthraquinone.

7. Method of purifying a mixture of 1:5-dinitro-4:8-diamino-anthraquinone and 1:8-dinitro-4:5-diamino-anthraquinone contaminated with beta-nitro-compounds and resulting from the nitration and hydrolysis of a mixture of 1:5-di-(acetylamino)-4:8-dinitro-anthraquinone and 1:8-di(acetylamino)-4:5-dinitro-anthraquinone, which comprises subjecting the mixture to the action of a hot 1–2% aqueous solution of normal sodium sulphite in an amount corresponding with 1–2 moles of normal sodium sulphite per mole of the crude mixture of dinitro-diamino-anthraquinones, until the beta-nitro-compounds have been converted into water-soluble products and separating the latter from the remaining mixture of 1:5-dinitro-4:8-diamino-anthraquinone and 1:8-dinitro-4:5-diamino-anthraquinone.

HENRY CHARLES OLPIN.
CHRISTOPHER STANLEY ARGYLE.
FRANK BROWN.